(12) United States Patent
Raginskii et al.

(10) Patent No.: US 6,616,385 B1
(45) Date of Patent: Sep. 9, 2003

(54) LIQUID TRANSPORT OF SOLID MATERIAL

(76) Inventors: Leonid Solomonovich Raginskii, Marshala Vershinina, 4-2-8, Moscow 123060 (RU); Vyacheslav Evgen'evich Morkovnikov, Zemlyanoi val, 52/16-156, Moscow, 109240 (RU); Nikolai Viktorovich Morozov, Rublevskoe shosse, 15-47, Moscow, 121108 (RU); Sergei Petrovich Eliseev, Novye Cheremushki, kvertal, 32-a-4-7, Moscow, 113461 (RU)

( * ) Notice: Subject to any disclaimer, the term of this patent is extended or adjusted under 35 U.S.C. 154(b) by 0 days.

(21) Appl. No.: 09/701,778

(22) PCT Filed: Jun. 3, 1999

(86) PCT No.: PCT/GB99/01540
§ 371 (c)(1),
(2), (4) Date: Jan. 24, 2002

(87) PCT Pub. No.: WO99/62799
PCT Pub. Date: Dec. 9, 1999

(30) Foreign Application Priority Data

Jun. 3, 1998 (RU) .......................................... 98110182

(51) Int. Cl.[7] .............................................. B65G 53/66
(52) U.S. Cl. ...................................................... 406/85
(58) Field of Search ............................................. 406/85

(56) References Cited

U.S. PATENT DOCUMENTS

| 3,258,852 A | | 7/1966 | White | 34/164 |
| 3,822,919 A | * | 7/1974 | Strom | 406/90 |
| 3,947,236 A | * | 3/1976 | Lasch, Jr. | 432/11 |
| 4,230,675 A | | 10/1980 | Yarbro | 422/272 |
| 4,278,531 A | | 7/1981 | Hodgson et al. | 209/11 |

FOREIGN PATENT DOCUMENTS

| EP | 0358354 B1 | | 3/1990 | B54G/53/30 |
| JP | 59-118621 | * | 7/1984 | |
| JP | 62-35531 | * | 2/1987 | |

* cited by examiner

Primary Examiner—Joseph A. Dillon
(74) Attorney, Agent, or Firm—Myers Bigel Sibley & Sajovec

(57) ABSTRACT

A method of transporting solid material pieces in the liquid phase of a mass-exchanging apparatus comprises forming pneumatic pulses in the apparatus, converting said pulses into reciprocal motion of the liquid phase by applying the pulses to the liquid phase and movement of the solid material pieces upwardly along a sloping ramp. The method is characterised in that the reciprocal motion of the liquid phase is directed via slits in the ramp at an acute angle to the direction of the movement of the solid material pieces upwardly along the ramp.

21 Claims, 4 Drawing Sheets

LIQUID TRANSPORT OF SOLID MATERIAL

FIELD OF THE INVENTION

The present invention relates to the liquid transport of solid material and involves the technology of mass exchanging processes between solid and liquid phases, such as cleaning, leaching and dissolving. The invention may be used in radiochemical, chemical, hydrometallurgical and another branches of industry. The invention may provide an efficient process for the treatment of a solid material, having the form of a cylindrical block whose length is 3 to 5 times its width and having a considerable density and a mass up to tens of grammes. The treatment may be, for example, cleaning metal goods by removing fatty contaminations or leaching of material pieces.

BACKGROUND OF THE INVENTION

The most advanced mass-exchanging process involves a counter-current motion of a solid and a liquid phase. Such a process makes it possible to cut down the contact time of the solid and liquid phases sufficient for effective mass-exchange. However, there is insufficient average time of the solid phase in the apparatus. The residence time is mainly dependent on the rate of solid phase settling and connected with the accumulation of that solid phase in the lower portion of the apparatus under a liquid (as it takes place in the case of column apparatus). This circumstance has led to the development of complicated and, as a rule, unreliable units for solid phase discharging.

The upward motion of the solid pieces simplifies their discharging and makes it possible to vary their residence time in mass-exchanging apparatus within a wider range and moreover by simpler apparatus.

A method for transporting solid material pieces on an inclined surface up to the top of a mass-exchanging apparatus under vibroexciter influence was described in the USSR Authors Certificate No 648240, wherein solid material pieces are disposed on the inclined surface which is oscillated at an angle to the direction of movement of the solid material.

This method allows the possibility of a counter-current motion of liquid and solid phases but the existence of moving parts exposed to the aggressive processing environment makes the method highly difficult for performing under large scale conditions. Furthermore, it is difficult to ensure reliable connection of inlet and outlet pipes with apparatus which is undergoing such oscillating movement. It is obvious that the vibrating source must have a limited mass to create the oscillations as vibration increases sharply with increasing exciter mass. As a result the apparatus must have small dimensions and consequently it has a low throughput.

A pulsed transporter and a method for transporting discrete solid objects during a mass-exchanging process with counter-current motion of solid and liquid phases are known from EP 0358354A. This apparatus comprises a generally V-shaped duct, adapted to contain a liquid and having an inlet for receiving at its upper end objects to be transported and an outlet for discharging treated objects. The outlet is connected to the inlet by a base below the inlet opening. Means are provided for applying at intervals a pressure pulse to the liquid for displacing objects through a discharge duct. Transport of the objects is the result of liquid pulsation and the difference in the solid properties in the inlet and outlet of the duct.

Simplicity of the transporter design and absence of moving structural components are important advantages. However it is desirable to arrange a plurality of such transporters in series with each other to provide a residence period of solid in the liquid sufficient for efficient mass-exchanging between the liquid and the solid material pieces which have considerable mass and density. As a result the reliability of equipment is decreased and the size of the technological plant is enlarged.

Method and apparatus for transporting a solid phase in a liquid using pneumatic pulse power are known from USSR ac N 874093. In this method liquid reciprocation created under the action of saw-like pulses. The motive force (the high-speed pressure of the liquid during its movement under the actions of the pneumatic pulse) overcomes the resistant force due to gravity, friction of the solid against the apparatus walls and local losses. As a result the solid material displaces upward and counter-currently to the liquid stream. The apparatus comprises a: V-shaped duct, adapted to contain the liquid phase; a inlet for receiving the object to be transported and, connected with a pulse generator, and a solid outlet.

Simplicity of the apparatus design and absence of moving components exposed to solid pieces or processing liquid are advantages. However, the method is not efficient at causing transport of the solid objects, having considerable mass and density, as the solid pieces motion is stoped when settling velocity of the pieces becomes the same as the lifting velocity.

SUMMARY OF THE INVENTION

The present invention provides a method for improving a counter-current mass-exchange in a "solid-liquid" system and an apparatus for transporting solid material pieces in the liquid during the mass-exchanging process.

According to one aspect of the present invention there is provided a method for improving a counter-current mass-exchange in a "solid-liquid" system the method comprising forming pneumatic pulses in the apparats, convering said pulses into reciprocal motion of the liquid phase by applying the pulses to the liquid phase and movement of the solid material pieces upwardly along a sloping ramp characterised in that the reciprocal motion of the liquid phase is directed via slits in the ramp at an acute angle to the direction of the movement of the solid material pieces upwardly along the ramp.

Preferably the reciprocal motion of the liquid phase is directed via slits in the ramp at an acute angle to the ramp causing reciprocal motion of the solid material pieces upwardly away from and along the ramp and downwardly towards the ramp so that the solid material pieces are transported upwardly along the ramp.

Preferably the slits are formed within steps in the ramp, whereby the steps limit movement of the solid material pieces downwardly along the ramp.

Preferably the pneumatic pulses have a sawtooth shed gas pressure profile.

Preferably said liquid reciprocation is directed in the form of a flat jets at ad acute angle.

The flat jets are preferably divided into fluid inlet/outlet zones distributed along the length of the apparatus.

Preferably said flat jets are directed upwardly and inclined at an acute angle to said solid pieces motion direction during a pressure pulse phase.

In a particular embodiment of the method said flat jets are formed simultaneously over substantially the entire length of the apparatus.

In another embodiment of the method said flat jets are formed in adjacent zones in counter-phase mode.

In yet another particular embodiment of the method said flat jets are formed in a running wave manner.

According to another aspect of the present invention there is provided an apparatus for transporting solid material pieces in a liquid phase during mass-exchanging processes comprising: means for forming pneumatic pulses; means for converting said pulses into reciprocal motion of the liquid phase by applying the pulses to the liquid phase and movement of the solid material pieces upwardly along a sloping ramp characterised in that the reciprocal motion of the liquid phase is directed via slits in the ramp at an acute angle to Me direction of the movement of the solid meal pieces upwardly along the ramp.

Preferably, the reciprocal motion of the liquid phase is directed via slits in the ramp at an acute angle to the ramp causing reciprocal motion of the solid material pieces away from and along the amp and downwardly towards the ramp so that the solid material pieces are transported upwardly along the ramp.

Preferably, the slits are formed avid steps in the ramp, whereby the steps limit movement of the solid material pieces downwardly along the ramp.

Preferably, the pneumatic pulses have a sawtooth shaped gas pressure profile.

Preferably, the apparatus comprises a tubular vessel, a ramp arranged inside the vessel an inlet and an outlet v charging and discharging respectively materials to and from the vessel and a pulse chamber for causing reciprocal motion of the liquid.

Preferably the longitudinal axis of the vessel is disposed at an angle of from 5 to 60° to the horizontal.

Preferably the ramp is in the form of a plurality of flat vanes arranged along the lien of the vessel.

Preferably said flat vanes form slotted nozzles.

Preferably said slotted nozzles are provided by a sleeve, disposed across said nozzles.

Preferably, the flat vanes are at an angle of from 5 to 450 to the longitudinal axis of the vessel, the vanes defining upper and lower areas of the vessel.

Preferably said lower area is divided by transverse partitions into zones, each of which is connected via a pipe to a pulse chamber.

Preferably, a grid is located between adjacent vanes of the ramp.

BRIEF DESCRIPTION OF THE DRAWINGS

In order to facilitate a better understanding of the nature of the present invention, an embodiment of the apparats and the method for transporting solid material pieces during counter-current mass-exchanging will now be described, by way of example only, with reference to the accompanying drawings in which.

DETAILED DESCRIPTION OF THE PREFERRED EMBODIMENT

Figure 1:
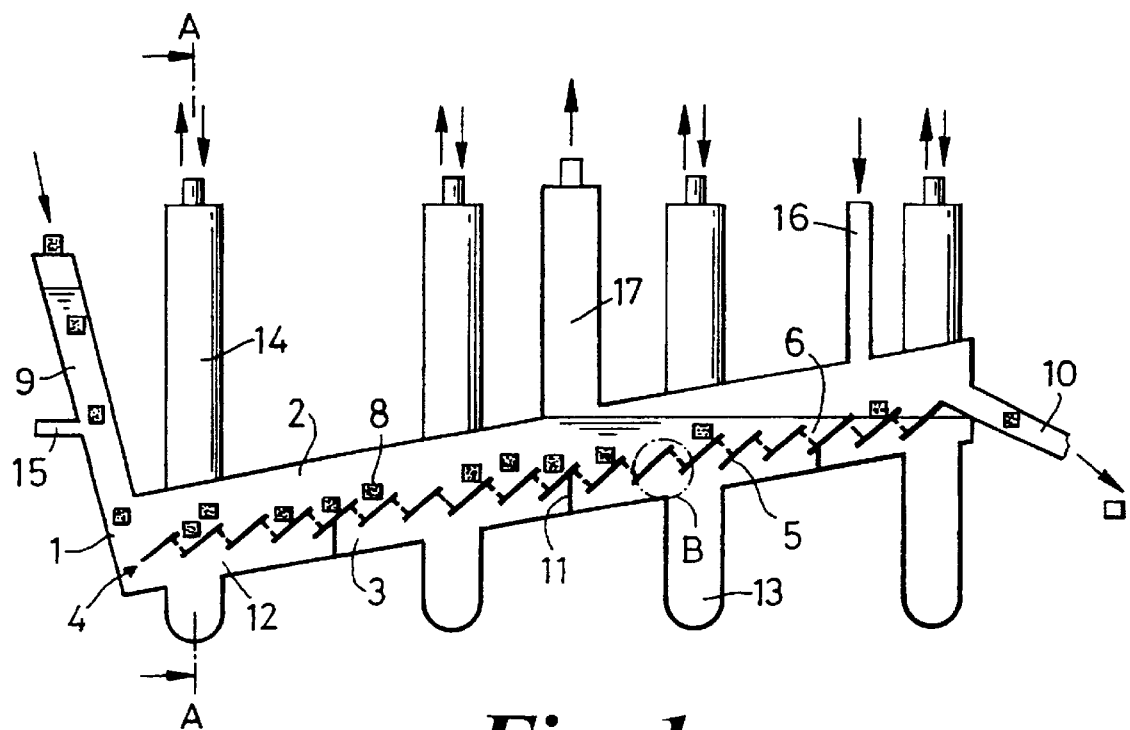
FIG 1 shows a cross-sectional view of an apparatus according to the present invention for transporting solid materials in a liquid.
Figure 2:
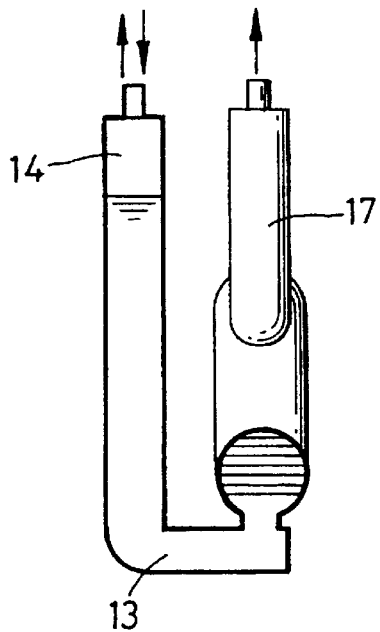
FIG. 2 shows a sectional view of the apparatus shown in FIG. 1, taken along the line A—A.
Figure 3:
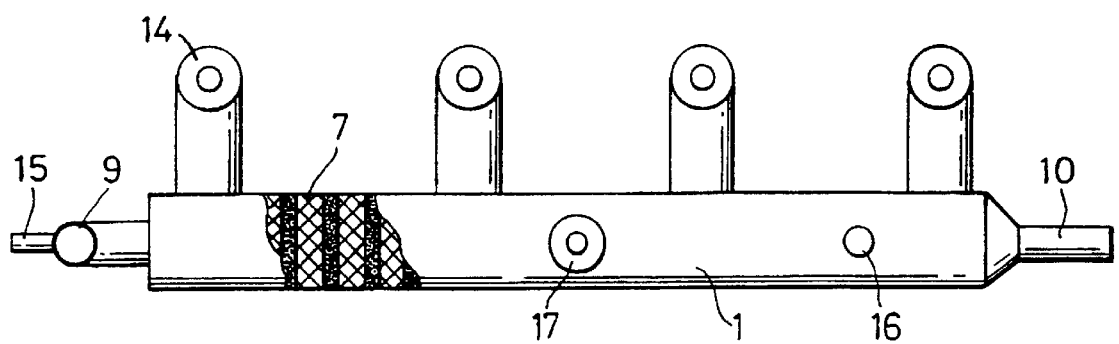
FIG. 3 shows top view on the apparatus.
Figure 4:
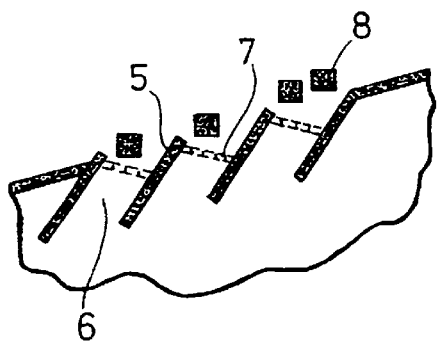
FIG. 4 shows a fragment of the ramp of the apparatus of FIG. 1.

Referring to FIGS. 1 to 4, apparatus in accordance with the present invention comprises a tubular vessel 1, subdivided into an upper area 2 and a lower area 3 by a ramp 4. The ramp 4 is formed by flat vanes 5 arranged in a side by side manner and fox slit nozzles 6 inclined at an angle of from 5 to 85 degrees to horizontal. A sieve or grid 7 is disposed between neighboring vanes 5 for holding solid material pieces 8 on the ramp 4. Various pipes connect to upper area 2. Pipe 9 has inlet opening 15 for solid charging and liquid discharging. Pipe 17 is for gas blowing through the apparatus. Pipe 10 is for discharging processed solid material and pipe 16 is for feeding in fresh solution (liquid phase). The lower area 3 is divided by transverse portions 11 into even number of sections 12, each of which communicates via a pipe 13 to its own pulse chamber 14, which is in turn connected to a pulse generator (not shown). The number of pulse chambers depends on the length of the tubular vessel 1 but is an even number.

The apparatus is operated as follows. The apparatus is filled with liquid reagent at a set flow rate through pipe 16. Solid material is supplied into upper area 2 via pipe 9. Pneumatic pulses with predetermined parameters (pressure, frequency and ratio of gas inlet and gas outlet time) are applied to the liquid contained in the pulse chambers 14. Under the influence of these pneumatic pulses, a predetermined volume of the liquid is forced out of the pulse chambers and passes through the pipes 13 into corresponding sectors 12. Then this liquid passes through the nozzles 6 and grids 7 and is transformed thereby into flat jets and passes into the upper area 2.

The surplus of liquid in the upper area 2 fills a free space in blow-through pipe 15. At this moment th liquid highspeed pressure overcomes the force of gravity acting on the solid material 8 and the latter comes off the grid 7, is raised by a certain height and is transported to adjacent nozzles of the ramp 4.

In the next moment spent compressed air is released from the pulse chambers 14 under the action of the pulsators. As a result the liquid returns to the pulse chambers 14 by the same route and fills the pulse chambers up to their initial level.

At the same time the solid pieces are pressed against the grids 7 by the reverse motion and become motionless. Thus the solid material pieces 8 are displaced with predetermined frequency up the ramp and discharged through the pipe 10. The liquid moves counter-currently to the solid material and leaves the apparatus via the pipe 15.

Figure 5:
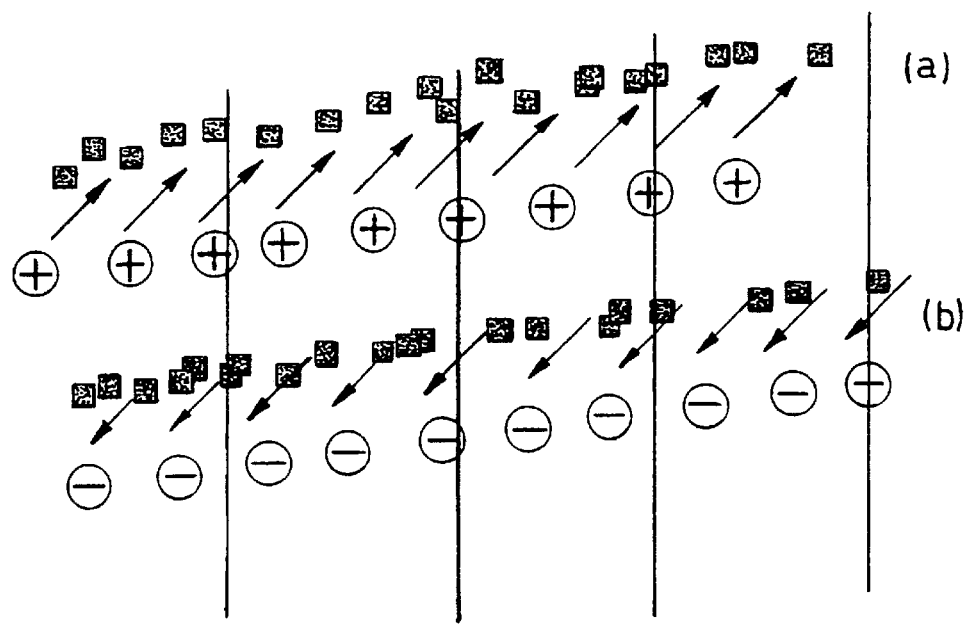
FIG. 5 shows the solid material motion under the influence of jets which are pulsed simultaneously.

In one embodiment of the present method shown in FIG. 5, all pulse chambers 14 work simultaneously from a single pulse generator. As a result the flat jets are formed simultaneously along the apparatus length and all the solid material comes off the ramp 4 and is displaced upwardly and forwardly (position "a" in FIG. 5). Then said solid material 8 becomes motionless as the flow reverses (position "b" in FIG. 5). This embodiment of the present method is particularly efficient when the solid material is disposed along the apparatus length as an even compact layer.

Figure 6:
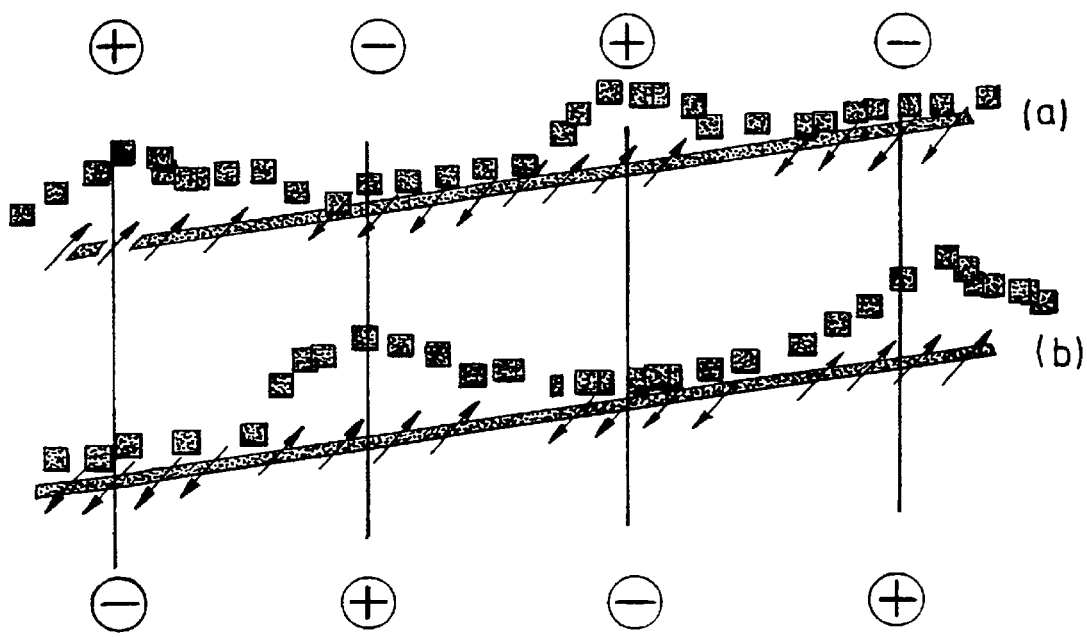
FIG. 6 shows the solid material motion under the influence of jets pulsed in groups in opposite directions.

In the embodiment of the present method shown in FIG. 6, the odd-number pulse chambers 14 operate simultaneously from a single pulse generator. The solid material, disposed over the odd-numbered sections bed to move, owing to forming of the flat jets in the odd-numbered sections (position "a" in FIG. 6). At the same time all the even numbered pulse chambers 14 operate simultaneously from a single pulse generator in counter-phase mode to return the liquid whilst spent gas is discharged out of the pulse chambers (position "b" in FIG. 6). Solid material pieces 8, disposed over the even-numbered sections, are motionless. This embodiment of the present method is particularly efficient when the solid material is disposed along the apparatus length as a thin layer.

Figure 7:
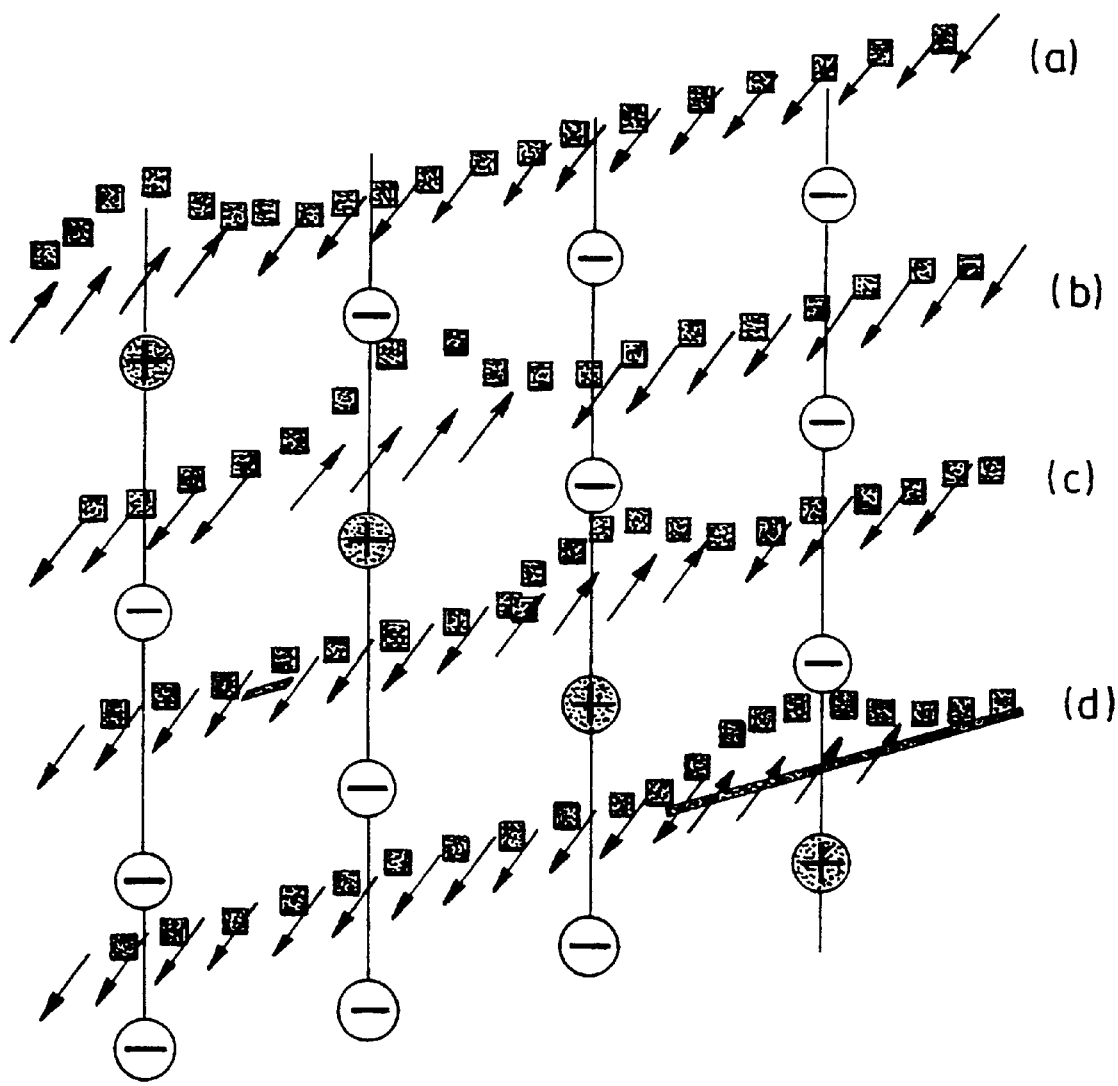
FIG. 7 shows the solid maternal motion under the influence of jets pulsed in a "running wave" manner.

In the embodiment of the present method shown in FIG. 7, the pulse chambers 14 work successively according to a predetermined program in a "running wave" manner. Positions a, b, c and d of FIG. 7 show the situation when jets are formed in the first, second, third and fourth sections of vessel respectively. Solid material pieces are transported in that section of the ramp, whose pulse chamber is operating at that time to form the flat jets. This embodiment of the present method is particularly efficient when the solid material is disposed along due apparatus length as separated heaps.

EXAMPLE

Three experiments were performed to clean shape cylindrical pieces of fatty contaminations. In all experiments the samples had characteristics as follows: mass: 6, 10, 20, 30, 36 grammes, length: 55 mm, diameter: 12 mm. The apparatus was shown in FIG. 1, its length being 2400 mm, its width 150 mm and the distance between the ramp vanes being 7 mm.

Experiment 1

The degreasing solution was poured into the apparatus, then the pulse generator was switched on to create saw-like compressed air pulses with a ratio of gas inlet time to gas outlet time of 0.2/2.5. The maximum pressure of air (Pmax) in each of the four pulse chambers was 0,065 MPa Solid samples were charged onto the lower part of the ramp at a rate of 100 pieces per minute with a layer thickness of 3 to 4 piece diameters. The time of passage of the samples along the ramp up to the outlet was recorded. The average retention time for the samples in the processing solution contained in the tubular vessel was recorded as 15 minutes.

Experiment 2

The samples charging rate was 40 unit/min and the layer thickness was equal to the sample diameter. The ratio of gas inlet time to gas outlet time was 0.3/0.3. Compressed air pulses (Pmax=0.060 MPa), were supplied at first into odd-numbered pulse chambers for 0.3 sec and then into even numbered chambers for the same time. The even-numbered clambers were connected to the blow-through system and the cycle was repeated. The retention time was recorded as 20 min.

Experiment 3

The samples charging rate was 20 unit/min and the ratio of gas inlet time to gas outlet time was 0.2/2.5. Compressed air pulses (Pmax=0.064 MPa) were successively supplied to processing solution contained in the pulse chambers by four ps generators operated in sequence in a "running wave" manner under the control of a electronic command device (not shown). The retention time was recorded as 22 min.

What is claimed is:

1. A method of transporting solid material pieces in a liquid within a mass-exchanging apparatus, comprising:

forming pneumatic pulses in the apparatus; and converting said pulses into reciprocal motion of the liquid by applying the pulses to the liquid such that the solid material pieces move upwardly along a sloping ramp; wherein the reciprocal motion of the liquid is directed via slits in the ramp having an acute angle to a direction of movement of the solid material pieces upwardly along the ramp.

2. A method according to claim 1, wherein the reciprocal motion of the liquid causes reciprocal motion of the solid material pieces upwardly away from and along the ramp and downwardly towards the ramp.

3. A method according to claim 1, wherein the ramp comprises steps formed therein, and wherein the slits are formed within the steps, and wherein the steps limit movement of the solid material pieces downwardly along the ramp.

4. A method according to claim 1, wherein the pneumatic pulses have a sawtooth shaped gas pressure profile.

5. A method according to claim 1, wherein the liquid is directed in the form of flat jets at said acute angle.

6. A method according to claim 5, wherein said flat jets are divided into fluid inlet/outlet zones distributed along the length of the mass-exchanging apparatus.

7. A method according to claim 5, wherein said flat jets are formed simultaneously over substantially the entire length of the mass-exchanging apparatus.

8. A method according to claim 5, wherein said flat jets are formed in adjacent zones in counter-phase mode.

9. A method according to claim 5, wherein said flat jets are formed in a running wave member.

10. A mass-exchanging apparatus for transporting solid material pieces in a liquid, comprising:

means for forming pneumatic pulses;

means for converting said pulses into reciprocal motion of a liquid by applying the pulses to the liquid such that the solid material pieces move upwardly along a sloping ramp; wherein the reciprocal motion of the liquid is directed via slits in the ramp having an acute angle to a direction of movement of the solid material pieces upwardly along the ramp.

11. An apparatus according to claim 10 wherein the reciprocal motion of the liquid causes reciprocal motion of the solid material pieces upwardly away from and along the ramp and downwardly towards the ramp.

12. An apparatus according to claim 10, wherein the ramp comprises steps formed therein, wherein the slits are formed within the steps, and wherein the steps limit movement of the solid material pieces downwardly along the ramp.

13. An apparatus according to claim 10 wherein the pneumatic pulses have a sawtooth shaped gas pressure profile.

14. An apparatus according to claim 10 comprising a tubular vessel, a ramp arranged inside the vessel, an inlet and an outlet for charging and discharging materials to and from the vessel respectively, and a pulse chamber for causing reciprocal motion of the liquid.

15. An apparatus according to claim 14 wherein a longitudinal axis of the vessel is disposed at an angle of from about 5 to 60 degrees to the horizontal.

16. An apparatus according to claim 14 wherein the ramp comprises a plurality of flat vanes arranged along the length of the vessel.

17. An apparatus according to claim 16 wherein the flat vanes are at an angle of from about 5 to 45 degrees relative to the longitudinal axis of the vessel, wherein said vanes define respective upper and lower areas of the vessel.

18. An apparatus according to claim 17 wherein said lower area is divided by transverse partitions into zones, each of which is connected via a pipe to a pulse chamber.

19. An apparatus according to claim 16 wherein a grid is located between adjacent vanes of the ramp.

20. A method according to claim 1 wherein the mass-exchanging process is a counter-current mass exchanging process.

21. An apparatus according to claim 10 wherein the mass-exchanging process is a counter-current mass exchanging process.

* * * * *